No. 796,207.
PATENTED AUG. 1, 1905.
W. F. HARBOUR.
PNEUMATIC COTTON HARVESTER.
APPLICATION FILED APR. 6, 1905.
3 SHEETS—SHEET 2.
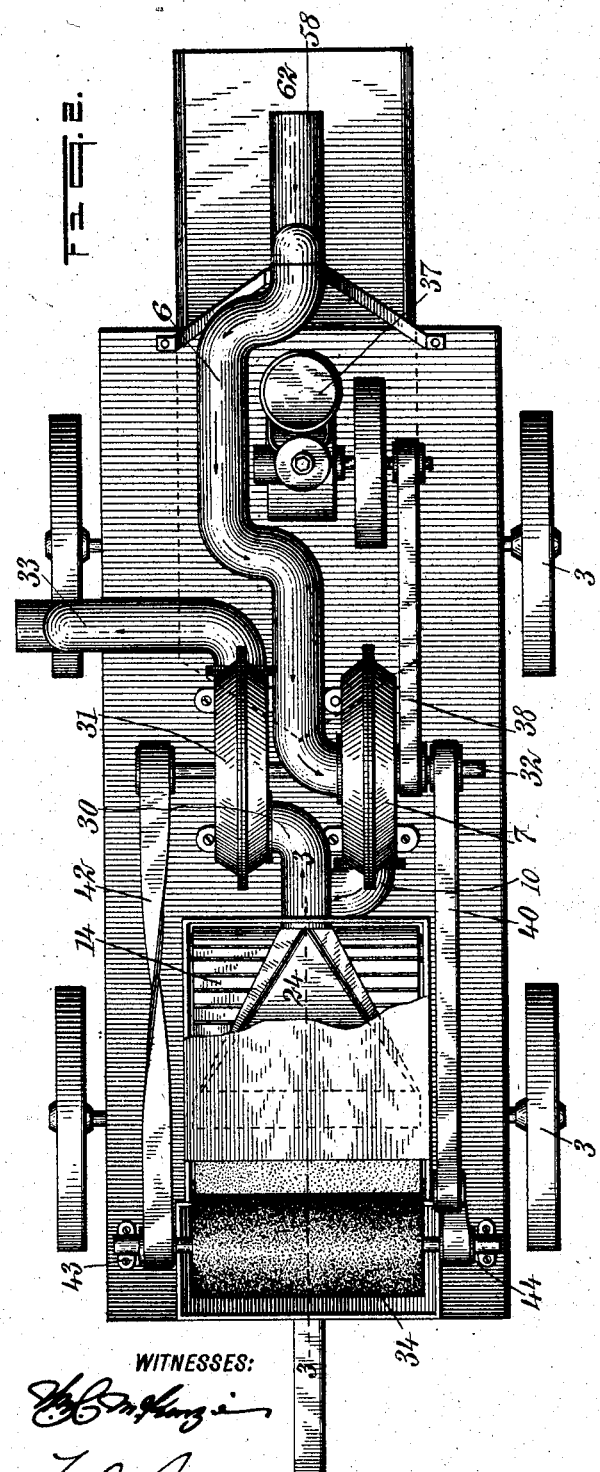
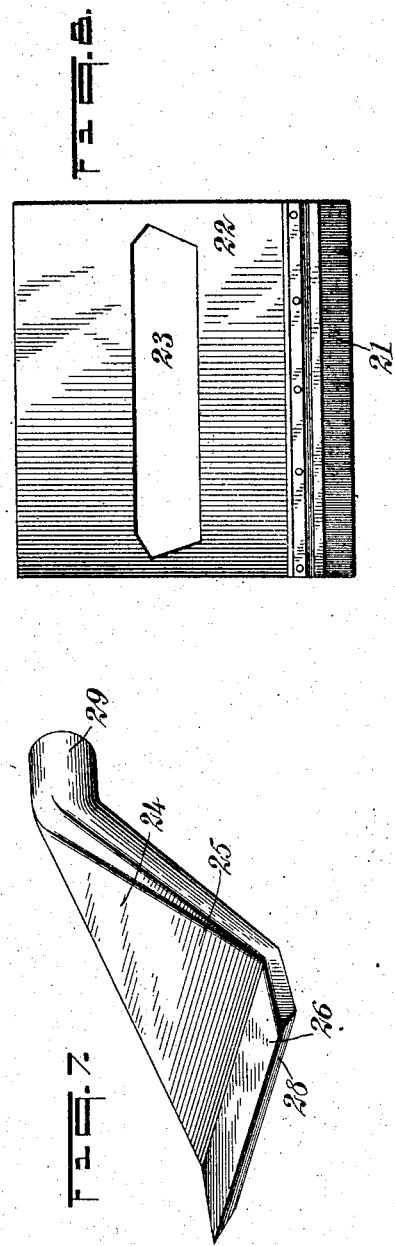
WITNESSES:
INVENTOR
William F. Harbour
BY
ATTORNEYS

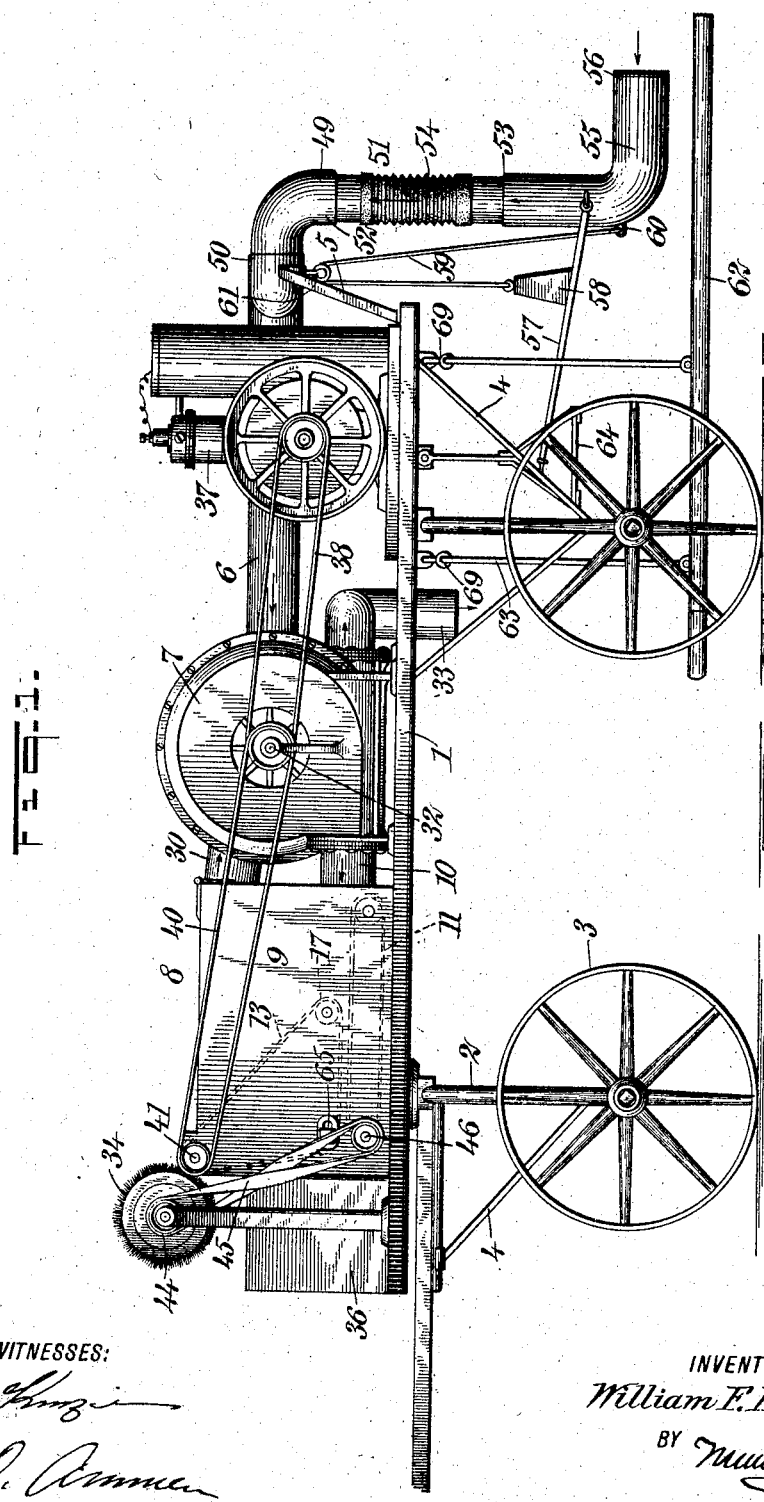

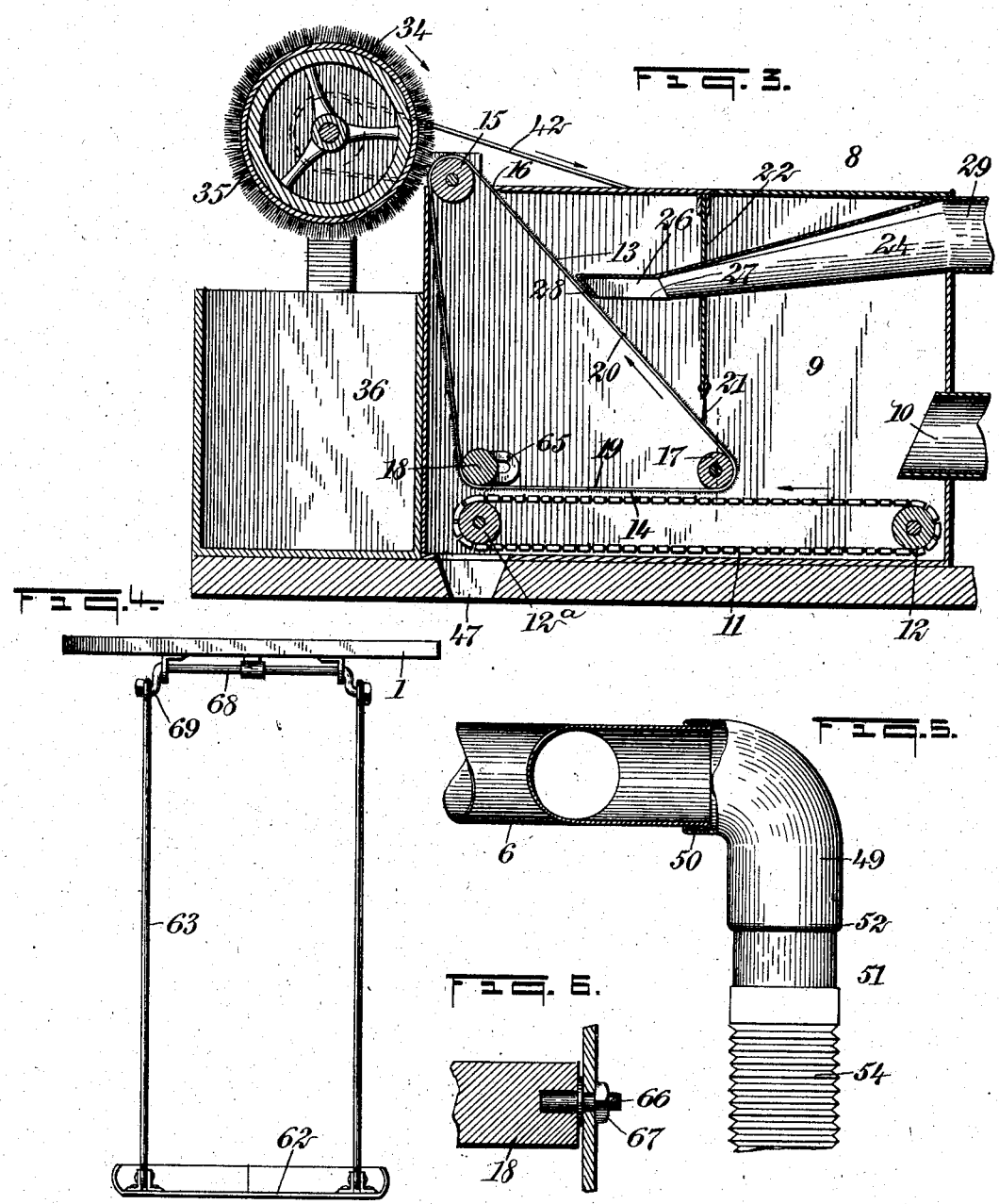

UNITED STATES PATENT OFFICE.

WILLIAM FRANKLIN HARBOUR, OF ATLANTA, GEORGIA.

PNEUMATIC COTTON-HARVESTER.

No. 796,207. Specification of Letters Patent. Patented Aug. 1, 1905.

Application filed April 6, 1905. Serial No. 254,162.

*To all whom it may concern:*

Be it known that I, WILLIAM FRANKLIN HARBOUR, a citizen of the United States, and a resident of Atlanta, in the county of Fulton and State of Georgia, have invented a new and Improved Pneumatic Cotton-Harvester, of which the following is a full, clear, and exact description.

This invention relates to cotton pickers or harvesters.

The object of the invention is to produce an implement of this class which is adapted to be advanced over a field of cotton and operated so as to gather the cotton and separate it from the leaves or other foreign objects which may be gathered therewith.

The invention contemplates the employment of pneumatic means for effecting both gathering and separating operations.

The invention concerns itself also with providing a construction which especially facilitates the manipulation of the gathering member.

Reference is to be had to the accompanying drawings, forming a part of this specification, in which similar characters of reference indicate corresponding parts in all the figures.

Figure 1 is a side elevation of the implement or machine. Fig. 2 is a plan, certain portions being broken away, as will appear. Fig. 3 is a vertical section taken on the line 3 3 of Fig. 2 and illustrating especially the separating mechanism. Fig. 4 is an elevation showing the arrangement for supporting the hanging platform or guard, which is mounted upon the implement. Fig. 5 is substantially a side elevation of a portion of a main trunk or tube, a portion being shown in section, as will appear. Fig. 6 is a cross-section taken at the end of a guide-roller and illustrating the manner of adjusting the same. Fig. 7 is a perspective of a pneumatic apron used at the separator, and Fig. 8 is an elevation of a partition in the separator and illustrating how it carries the apron.

Referring more particularly to the parts, 1 represents the body, which consists, substantially, of the bottom of a wagon, the same being mounted upon axles 2, carrying wheels 3, adapting the implement to be drawn along by horses or other draft-animals. The axles 2 are preferably braced by diagonals 4. At the right of the body 1, as shown in Fig. 1, I provide a frame 5, which supports the forward extremity of the main exhaust pipe or tube 6. The body of this pipe extends rearwardly and connects with the main exhaust-blower 7, which is mounted upon the upper side of the body, preferably near the middle portion thereof. Beyond this exhaust-blower 7 I provide a separator 8, the same comprising a casing 9 of common box form, as shown, and into this casing a delivery-pipe 10 passes from the blower 7. Within the casing 9, and near the lower portion thereof, I provide a conveyer-belt 11, which is driven continuously in a manner which will be described more fully hereinafter, passing about guide-rollers 12, as shown. Toward the extremity of this conveyer-belt, which is removed from the delivery-pipe 10, I provide a separator-belt 13, which is composed of card-clothing having the usual body of leather provided with outwardly-projecting teeth 14. As indicated most clearly in Fig. 3, this separator-belt is guided so as to present the form of a triangle passing to an elevated guide-roller 15, which is mounted beyond an opening 16 in the upper wall of the casing 9. Near its lower portion the belt is guided upon belt-rollers 17 18, the former of which is located at substantially the middle point of the conveyer-belt. From this arrangement this belt presents a substantially horizontal lower course 19 and an elevated inclined course 20.

At a point a short distance above the roller 17 I provide a brush 21, the bristles whereof are arranged in a substantially vertical plane and in such a manner they will brush the surface of the belt 13 as it passes beneath the brush. This brush 21 is attached to the lower edge of a partition or transverse wall 22, which is mounted in the casing 9, as indicated.

As shown most clearly in Fig. 8, this partition is provided with an opening 23, and through this opening passes a separator-apron 24. The form of this apron is very clearly illustrated in Fig. 7. It comprises a fan-like body 25, provided at its forward extremity with a flanged wing or tip 26, presenting an opening 27 on its under side and having an end face or cheek 28, which is held adjacent to the course 20 of the separator-belt 13. The apron 24 is formed with a tubular neck 29, which is attached to a pipe connection 30, as shown in Fig. 1. This pipe connection leads to an auxiliary blower 31, which is preferably mounted opposite to the aforesaid blower 7, the said blowers having a common shaft 32. From the auxiliary blower 31 a waste-delivery pipe 33 leads to the side of the implement, as shown.

At the end of the separator-casing 9 and near the roller 15 I mount a doffer-brush 34. As indicated most clearly in Fig. 3, the body of this brush is cylindrical and its face is covered with brush-bristles 35, and these bristles are adapted to brush the surface of the separator-belt 13 as it passes over the roller 15. Beneath the doffer 34 I provide a receptacle or receiver 36 for the cotton as it falls from the brush. Arrangement is made for continuously driving the belts 13 and 11 and the brush 34. Any motive power desired may be used for this purpose; but I prefer to use a gasolene-engine 37, which is mounted at a convenient position upon the body 1. The shaft of this engine is connected by a belt 38 in such manner as to drive the shaft 32 of the blowers.

From the shaft 32 a belt 40 leads to a pulley 41, which is rigidly attached to the shaft of the roller 15 aforesaid. In this way movement is transmitted to the separator-belt 13, which is driven in the direction of the arrow, as indicated in Fig. 3.

From the opposite side of the blowers a belt 42, which is twisted as shown, affords means for driving the shaft of the brush 34, said shaft being provided with a pulley 43 for this purpose. The shaft of the brush 34 is provided with a second pulley 44, from which a twisted belt 45 leads down to a pulley 46, said pulley 46 being carried by the roller $12^a$ beneath the belt 13. Just below this roller $12^a$ and beneath the rear extremity of the conveyer-belt 14 an opening 47 is provided through the body 1. From the arrangement of belting described it should be understood that the upper course of the conveyer-belt 14 will move in the direction of the arrow adjacent to the same, as shown in Fig. 3.

At the forward extremity of the main tube or trunk 6 an elbow 49 is attached by means of a swivel connection 50, said connection being shown most clearly in Fig. 5. Below this elbow a vertical connection 51 leads downwardly, said connection comprising swivel-joints 52 53 and a flexible connecting-sleeve 54, of canvas or similar material. Below the joint 53 a second elbow 55 is attached, the same having a substantially horizontal suction-mouth 56. To the vertical body of the elbow 55 at a suitable point handles 57 are attached, the same being disposed on opposite sides of the elbow, affording means for twisting the same from side to side or elevating the mouth 56, as will be readily understood. The weight of the elbow 49 and its connecting parts is counterbalanced by means of a counterweight 58, which is suspended upon the loose end of a cord 59, one end of said cord being attached at 60, as shown, the body of said cord passing around a pulley 61, which is attached near the forward extremity of the main pipe 6 and adjacent to the swivel-joint 50.

At a short distance above the ground-level a guard or platform 62 is supported, the same being freely hung upon links 63, which depend from the under side of the body 1. At a suitable height above this platform 62 a seat 64 is suspended from the under side of the body 1, as indicated, the same being adapted to seat the operator of the implement. In this way the operator is supported in a convenient position to grasp the handles 57 for operating the picking-mouth 56.

I provide an arrangement for adjusting the tension of the horizontal course 19 of the separator-belt 13. For this purpose the side walls of the casing 9 are provided with slots 65, disposed horizontally, as indicated, and in these slots gudgeons 66 are movably mounted, said gudgeons supporting the roller 18, as indicated most clearly in Fig. 6. The projecting extremities of these gudgeons are provided with clamping-nuts 67, which afford means for clamping the roller in any position desired.

I provide an arrangement for enabling the platform or guard 62 to rise above obstructions which may pass beneath it as the implement advances. For this purpose the aforesaid links 63, which support the platform, are supported at their upper extremities upon transverse shafts 68, as indicated in Fig. 4, the same being formed at their extremities into downwardly-projecting cranks to which the said links attach.

In practice the distance between the wheels on the opposite side of the implement would be great enough so that the machine could span two adjacent rows of cotton, and the width of the guard or platform 62 will be sufficient to substantially bridge the space between the same rows.

In the operation of the implement it should be understood that it may be advanced by horses or other draft-animals, and as the implement advances the operator upon the seat 64 would raise, lower, and twist the inlet-mouth 56 of the main suction-tube 6 so as to bring the same nearer the locks of growing cotton. At the same time the blowers 7 and 31 would be driven continuously by the engine 37 and would operate to produce a current of air through the tubes 6 and 33 in the direction of the arrows, as indicated in Fig. 2. The influx of air at the mouth 56 would draw with it the disengaged locks of cotton, which would pass inwardly and be delivered to the pipe 10 and upon the conveyer-belt 11. Here the cotton would be advanced upon the belt 11 and would be brought into contact with the teeth of the separator-belt 13.

Referring again to the operation of the nozzle or mouth 56, the advantage of the guard-platform 62 will be pointed out. The function of this guard-platform is not only to afford a support for the feet of the operator, but it cuts off the effects of the influx of air upon the light objects, such as leaves, which might lie in the path of the implement between the cotton-rows. The cotton which is exposed to the action of the separator-belt 13 is caught in the teeth thereof and passes upwardly along the course 20. It is then presented to the brush 21, which operates to throw off light objects, such as leaves and grass, which are not especially adapted for clinging to the clothing. If any of these objects have cotton caught with them, this cotton will be exposed again to the action of the separator-belt near the roller 17 and will eventually become attached to the belt 13, leaving the grass or other foreign matter behind. This waste stuff will then be advanced with the belt 11 and delivered finally at the opening 47. Whatever light foreign objects, such as grass or leaves, should happen to pass the brush 21, these would be gathered by the pneumatic apron 24, passing into the opening 27 and being delivered through the delivery-pipe 33. As the cotton carried by the belt 13 arrives at the roller 15 it is subjected to the action of the brush 34, which brush rotates at such a high velocity that it operates as a doffer to remove the cotton, and the cotton then falls into the receptacle 36.

It should be understood that the brush 21 passes completely across the face of the separator-belt, and likewise with respect to the extremity or wing 26 of the apron 24. From this arrangement it follows that a partial vacuum may be readily produced in the exhaust-tube 30, resulting in producing a rush of air through the brush 21 near the face of the separator-belt course 20.

It should be understood that the swivel-joints 50, 52, and 53 are also telescoping joints, so that they readily enable the picking nozzle or mouth 56 to be raised and lowered or extended. The counterweight 58 of course operates to relieve the strain of supporting the weight of the nozzle and its contiguous parts.

The outline of the opening 23 through the wall 22 conforms substantially to the shape of the apron 24, so that no air can flow toward the inlet 27 at this point. Hence it will be apparent that the brush 21 and the upper wall of the casing cut off a portion of the belt 13 from the surrounding air. In this way the space surrounding the extremity of the apron constitutes an exhaust-box. The partial vacuum produced in this box results in developing an air-current through the brush and upwardly along the face of the belt 13 toward the inlet-apron.

Having thus described my invention, I claim as new and desire to secure by Letters Patent—

1. In a pneumatic cotton-harvester, in combination, a pneumatic gathering-tube, a conveyer-belt upon which said tube delivers, a separator-belt, means for guiding said belts in courses lying adjacent, a brush coöperating with said separator-belt, to affix the cotton thereto, a pneumatic tube having an inlet-opening adjacent to said separator-belt, and a doffer-brush for collecting the cotton from said separator-belt.

2. In a pneumatic cotton-harvester, in combination, a pneumatic gathering-tube, a conveyer-belt to which said tube delivers, a separator-belt adapted to receive the cotton from said conveyer-belt, a brush coöperating with said separator-belt to affix the cotton thereto, a pneumatic tube having an inlet-mouth adjacent to said separator-belt, a doffer-brush operating to remove the cotton from said separator-belt, a receptacle adapted to receive the cotton from said doffer-brush, means for driving said belts continuously, and means for producing air-currents in said tubes.

3. In a pneumatic cotton-harvester, in combination, a pneumatic gathering-spout, a main suction-tube, a universal connection between said spout and said tube, and a guard-platform disposed beneath said gathering-spout and covering the ground therebelow.

4. In a pneumatic cotton-harvester, in combination, a body mounted on wheels, a platform suspended therebelow, a pneumatic gathering-spout, an exhaust-main, a universal connection between said spout and said main, and means for operating said spout from said platform.

5. In a pneumatic harvester, in combination, a pneumatic gathering-spout, an exhaust-main, a universal connection therebetween and having a vertically-disposed body, with telescoping joints, and a counterweight supporting said spout.

6. In a pneumatic cotton-harvester, in combination, a body mounted on wheels, a gathering-spout, a platform suspended from said body and disposed below said spout, and crank-shafts supporting said platform from said body.

In testimony whereof I have signed my name to this specification in the presence of two subscribing witnesses.

WILLIAM FRANKLIN HARBOUR.

Witnesses:
    ED. L. CHESHIRE,
    FREDEN S. STEWART.